H. R. TAYLOR.
GEAR CUTTING TOOL.
No. 75,219.  Patented Mar. 3, 1868.
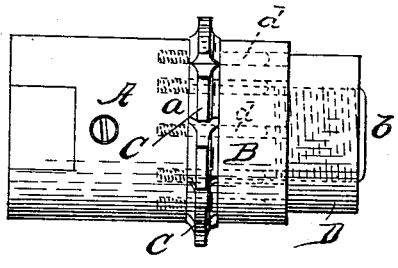
Fig. 1.
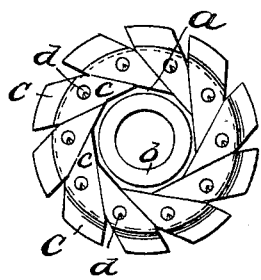
Fig. 2.
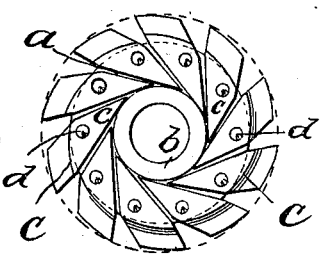
Fig. 3.

United States Patent Office.

HENRY R. TAYLOR, OF WESTPORT, CONNECTICUT.

*Letters Patent No. 75,219, dated March 3, 1868.*

IMPROVED GEAR-CUTTING TOOL.

*The Schedule referred to in these Letters Patent and making part of the same.*

TO ALL WHOM IT MAY CONCERN:

Be it known that I, HENRY R. TAYLOR, of Westport, in the county of Fairfield, and State of Connecticut, have invented a new and useful Improvement in Rotary Cutters, applicable to cutting teeth of gear-wheels and other purposes, of which the following is a full, clear, and exact description, reference being had to the accompanying drawing, forming part of this specification, and in which—

Figure 1 represents a longitudinal view of a rotary cutting-tool, with edge-exposure of its cutting-blades, constructed in accordance with my improvement.

Figure 2, a transverse view of said cutting-tool, with the clamping-ring and locking-nut to the blades removed, and showing the latter as they are or may be packed or set for turning them in the formation of the cutter; and Figure 3, a similar view, but showing the blades in the position they are made to assume when ready for cutting.

This, my invention, which is alike applicable to cutting the teeth of gear-wheels, milling, and other purposes, according to the configuration given the blades at their cutting-edges, consists in making up the cutter, that is, of a rotary character, of a series of detachable and separate cutting-blades or teeth, swinging on pivots or centres connected with the stock in such manner as that, while they may similarly and simultaneously be dressed or turned on and in connection with the stock, in a sweep or circle struck from the centre of the latter, said blades, after being so dressed or formed, and suitably hardened, may be swung on their pivots and clamped, so that they have a circumferential inclination relatively to the whole cutter, for the purpose of establishing clearance.

By this construction of rotary cutter of the character referred to, any one or more of the teeth or blades may be separately sharpened or replaced by a new one when worn, without removal of the rest, or without throwing away or casting on one side the whole cutter.

Referring to the accompanying drawing, in which the cutting-blades or teeth are shown, (as more clearly seen in fig. 1,) as having a contour or shape applicable to cutting the teeth of gear-wheels, but which may be of any suitable different configuration, so far as regards their noses or cutting-portion, accordingly as the same are required for screw-cutting, milling, or other purposes, A indicates the stock of the cutter of, say, cylindrical form, and which may be fitted on to the mandrel of a lathe, or be otherwise suitably held and rotated. This stock is or may be formed with a shoulder, $a$, and reduced portion $b$, over which latter a clamping-ring, B, is slid, and lock-nut D, fitted to hold the cutting-teeth or blades C, the same being griped or held between the shoulder $a$ and ring B. These teeth or blades are made in the form of curvilinear sections, where they project from the stock, and are separate or distinct from the shoulder-portion $a$ thereof. They are preferably of like size and shape, whereby their manufacture is facilitated, and joint action rendered uniform. Loosely pivoted, as represented, they are of a self-adjusting character, and may be similarly and simultaneously fitted or shaped or finished, ready for hardening, by introducing around the reduced portion $b$ of the stock, and between it and the tails $c$ of the blades, a thimble or ring, which will operate to set the tails $c$ back, and cutting-sections or portions of said blades forward, there being a slight play or room left between them, by reason of their size, which will admit of the blades being so swung on their pivots $d$, and whereby their bodies or tails are made to bear against each other, as represented in fig. 2, in which position being suitably clamped, said blades may be conjointly turned circumferentially and laterally from and with the stock or holder A as a centre of motion.

Thus uniformly shaped or dressed, the thimble or ring holding them in the position represented in fig. 2, may be removed, and the teeth or blades hardened, after which they may be replaced on their pivots $d$, and be swung or set so as to assume the position represented in fig. 3, causing their tails to be supported on the reduced portion $b$, and their cutting-portions to be thrown back, as indicated by red circle in said figure, and which will give the cutting-portions a circumferential inclination or dip inwards in a backwardly direction, relatively to the whole cutter or travel of the advance edges of the noses of the blades, thus making the blades circumferentially eccentric to the stock or holder A, in order to establish or facilitate clearance in cutting, and to this position the blades are made self-adjusting in a uniform manner by the resting of their tails on the portion $b$ of the stock. A clamping-ring, B, may be fitted over the reduced portion $b$, and pivots $d$ and locking-nut D applied to hold the blades steady to their places on the stock.

A rotary cutter thus constructed can readily have any of its cutting-teeth or blades re-ground or replaced by new ones, thereby making the whole cutter more durable, and inducing considerable economy, while, as before observed, they are of a self-adjusting character as regards uniformity of set, and proper clearance and support of them by or on the stock in cutting.

If desired, there may be arranged upon the same stock two or more rows or sets of cutting-teeth or blades of different thicknesses or shape for performing different kinds of work or thicknesses of cut from or by the same stock.

What is here claimed, and desired to be secured by Letters Patent, is—

The rotary cutter, made up substantially as described, of a stock or holder and loose or separate cutting-teeth or blades pivoted to the holder, and forming curvilinear sections outside of the latter, and constructed so as to be self-adjustable therein, or relatively thereto and each other.

HENRY R. TAYLOR.

Witnesses:
JOHN W. TAYLOR,
DAVID W. SHERWOOD.